(12) United States Patent
Burdgick et al.

(10) Patent No.: US 10,036,268 B2
(45) Date of Patent: Jul. 31, 2018

(54) STEAM TURBINE ROTOR SEAL SLIDING KEY MEMBER, RELATED ASSEMBLY AND STEAM TURBINE

(71) Applicant: General Electric Company, Schenectady, NY (US)

(72) Inventors: Steven Sebastian Burdgick, Schenectady, NY (US); Sean Christopher Morrissey, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 14/960,948

(22) Filed: Dec. 7, 2015

(65) Prior Publication Data

US 2017/0159476 A1    Jun. 8, 2017

(51) Int. Cl.
*F01D 11/00* (2006.01)
*F16J 15/447* (2006.01)
(Continued)

(52) U.S. Cl.
CPC .............. *F01D 11/001* (2013.01); *F01D 5/02* (2013.01); *F16J 15/4472* (2013.01);
(Continued)

(58) Field of Classification Search
CPC ...... F01D 11/006; F01D 11/001; F01D 11/02; F01D 5/02; F01D 25/24; F16J 15/4472;
(Continued)

(56) References Cited

U.S. PATENT DOCUMENTS

| 3,096,074 A | * | 7/1963 | Pratt | ..................... F01D 5/3015 |
| | | | | 416/215 |
| 4,304,523 A | * | 12/1981 | Corsmeier | ............ F01D 5/3015 |
| | | | | 29/889.21 |

(Continued)

FOREIGN PATENT DOCUMENTS

| EP | 0 921 272 A2 | 6/1999 |
| EP | 1 584 794 A1 | 10/2005 |
| EP | 2 218 873 A1 | 8/2010 |

OTHER PUBLICATIONS

Zheng et al., Rotating brush seal with bristle shield, GE co-pending Application No. 15237692, filed on Aug. 16, 2016.

(Continued)

*Primary Examiner* — Jason Shanske
*Assistant Examiner* — Topaz L Elliott
(74) *Attorney, Agent, or Firm* — Ernest G. Cusick; Hoffman Warnick LLC (57) ABSTRACT

Various embodiments include a rotor key member, along with a related assembly and steam turbine. Particular embodiments include a rotor key member for circumferentially retaining a circumferential seal in a steam turbine rotor body, the rotor key member having: a main body sized to contact an axial face of the circumferential seal; and a locking member extending from the main body in a direction axially toward the circumferential seal, the locking member having at least one circumferential edge sized to substantially complement a corresponding slot in the circumferential seal to restrict movement of the circumferential seal relative to the steam turbine rotor body.

15 Claims, 8 Drawing Sheets

(51) Int. Cl.
*F01D 5/02* (2006.01)
*F01D 11/02* (2006.01)

(52) U.S. Cl.
CPC .......... *F01D 11/02* (2013.01); *F05D 2220/31* (2013.01); *F05D 2260/30* (2013.01)

(58) Field of Classification Search
CPC .......................... F16J 15/3288; F16J 15/3292; F05D 2220/31; F05D 2260/30; F05D 2240/56; F05D 2240/59; F05D 2240/55; F16L 33/04
USPC ........... 415/173.7; 416/204 A; 277/373, 372, 277/366, 367
See application file for complete search history.

(56) References Cited

U.S. PATENT DOCUMENTS

| | | | |
|---|---|---|---|
| 4,846,628 A | 7/1989 | Antonellis | |
| 5,236,302 A | 8/1993 | Weisgerber et al. | |
| 5,318,405 A * | 6/1994 | Meade | F01D 5/3015 416/220 R |
| 5,622,475 A | 4/1997 | Hayner et al. | |
| 6,106,234 A * | 8/2000 | Gabbitas | F01D 5/3015 416/220 R |
| 7,371,050 B2 * | 5/2008 | Pasquiet | F01D 5/3015 416/204 A |
| 7,566,201 B2 * | 7/2009 | Brillert | F01D 5/081 29/889.2 |
| 8,105,041 B2 * | 1/2012 | Brillert | F01D 5/3015 416/220 R |
| 8,888,460 B2 * | 11/2014 | Ahaus | F01D 5/081 416/220 R |
| 9,327,368 B2 * | 5/2016 | Hagan | F02C 7/28 |
| 9,835,253 B2 | 12/2017 | Aksit | |
| 2012/0251303 A1 | 10/2012 | Zheng et al. | |
| 2012/0288361 A1 | 11/2012 | Lu et al. | |
| 2014/0127007 A1 | 5/2014 | Aiello et al. | |
| 2017/0089215 A1 | 3/2017 | Zheng et al. | |

OTHER PUBLICATIONS

Extended European Search Report and Opinion issued in connection with corresponding EP Application No. 16201568.9 dated Mar. 10, 2017.
U.S. Appl. No. 14/960,987, Office Action 1 dated Feb. 7, 2018, 15 pages.
U.S. Appl. No. 14/960,975, Office Action dated Feb. 8, 2018, 18 pages.
U.S. Appl. No. 14/960,961, Office Action dated Feb. 9, 2018, 15 pages.
U.S. Appl. No. 14/960,975, Notice of Allowance dated May 22, 2018, 5 pages.
U.S. Appl. No. 14/960,987, Notice of Allowance dated Jun. 12, 2018, 10 pages.
U.S. Appl. No. 14/960,961, Notice of Allowance dated Jun. 13, 2018, 7 pages.

* cited by examiner

STEAM TURBINE ROTOR SEAL SLIDING KEY MEMBER, RELATED ASSEMBLY AND STEAM TURBINE

BACKGROUND OF THE INVENTION

The subject matter disclosed herein relates to steam turbines. Specifically, the subject matter disclosed herein relates to seal devices in steam turbines.

Steam turbines include static nozzle assemblies that direct flow of a working fluid into turbine buckets connected to a rotating rotor. The nozzle construction (including a plurality of nozzles, or "airfoils") is sometimes referred to as a "diaphragm" or "nozzle assembly stage." Steam turbine diaphragms include two halves, which are assembled around the rotor, creating horizontal joints between these two halves. Each turbine diaphragm stage is vertically supported by support bars, support lugs or support screws on each side of the diaphragm at the respective horizontal joints. The horizontal joints of the diaphragm also correspond to horizontal joints of the turbine casing, which surrounds the steam turbine diaphragm.

Steam turbines utilize seals between rotor components and stator components, typically radially outward of the rotor bucket tip and radially inward of the diaphragm nozzle cover (stator). While some seals are formed as teeth on the rotor and/or stator, other configurations include a circumferential (or, rotating) seal that is located within a circumferential dovetail slot in the rotor. These rotating (circumferential) seals present unique design constraints, including, radial retention, rotation control, circumferential locking, and consistency of sealing across the circumference.

BRIEF DESCRIPTION OF THE INVENTION

Various embodiments include a rotor key member, along with a related assembly and steam turbine. Particular embodiments include a rotor key member for circumferentially retaining a circumferential seal in a steam turbine rotor body, the rotor key member having: a main body sized to contact an axial face of the circumferential seal; and a locking member extending from the main body in a direction axially toward the circumferential seal, the locking member having at least one circumferential edge sized to substantially complement a corresponding slot in the circumferential seal to restrict movement of the circumferential seal relative to the steam turbine rotor body.

A first aspect of the disclosure includes a rotor key member for circumferentially retaining a circumferential seal in a steam turbine rotor body, the rotor key member having: a main body sized to contact an axial face of the circumferential seal; and a locking member extending from the main body in a direction axially toward the circumferential seal, the locking member having at least one circumferential edge sized to substantially complement a corresponding slot in the circumferential seal to restrict movement of the circumferential seal relative to the steam turbine rotor body.

A second aspect of the disclosure includes a steam turbine rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body, the circumferential seal including at least one circumferentially extending slot; and a rotor key member having: a main body sized to contact an axial face of the circumferential seal; and a locking member extending from the main body in a direction axially toward the circumferential seal, the locking member having at least one circumferential edge sized to substantially complement the circumferentially extending slot in the circumferential seal to restrict movement of the circumferential seal relative to the rotor body.

A third aspect of the disclosure includes a steam turbine having: a casing; and a rotor assembly at least partially contained within the casing, the rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body, the circumferential seal including at least one circumferentially extending slot; and a rotor key member having: a main body sized to contact an axial face of the circumferential seal; and a locking member extending from the main body in a direction axially toward the circumferential seal, the locking member having at least one circumferential edge sized to substantially complement the circumferentially extending slot in the circumferential seal to restrict movement of the circumferential seal relative to the rotor body.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to steam turbines. Specifically, the subject matter disclosed herein relates to rotating seals in steam turbines.

According to various embodiments of the disclosure, a device (e.g., key member) is configured to lock/unlock a circumferential (rotatable) seal in a steam turbine, both radially retaining that seal as well as preventing rotation. Conventional approaches to retain circumferential seals allow for unwanted rotation, and are also susceptible to slipping and creep, which can both diminish the effectiveness of the seal and wear on the seal and adjacent components. In contrast to these conventional approaches, various embodiments include a radial key member sized to engage a key slot within the rotor body and radially retain an adjacent circumferential seal. In some cases, the radial key member is located between circumferentially disposed seal retaining members. In additional embodiments, a second key member is used to lock the radial key member in place and retain the rotating seal in the circumferential dimension. The radial key member can include at least one axially extending hook sized to engage the slot in the rotor body. The radial key member has a sufficient axial width to contact both the circumferential seal and the axially facing wall of the key slot in the rotor body.

As denoted in these Figures, the "A" axis represents axial orientation (along the axis of the turbine rotor, sometimes referred to as the turbine centerline, omitted for clarity). As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location. Identically labeled elements in the Figures depict substantially similar (e.g., identical) components.

Figure 1:
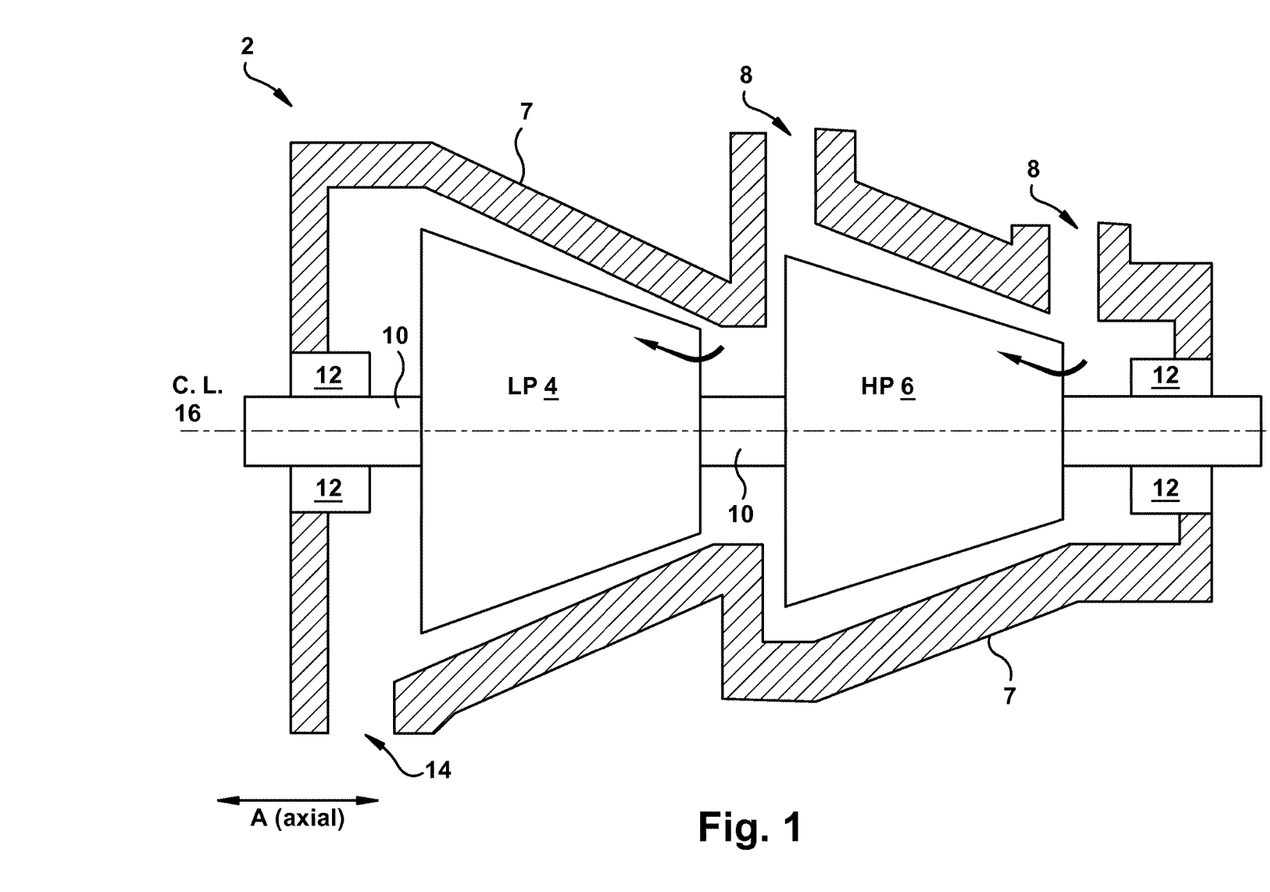
FIG. 1 shows a partial cross-sectional schematic view of steam turbine according to various embodiments.

Turning to FIG. 1, a partial cross-sectional schematic view of steam turbine 2 (e.g., a high-pressure/intermediate-pressure steam turbine) is shown. Steam turbine 2 may include, for example, a low pressure (LP) section 4 and a high pressure (HP) section 6 (it is understood that either LP section 4 or HP section 6 can include an intermediate pressure (IP) section, as is known in the art). The LP section 4 and HP section 6 are at least partially encased in casing 7. Steam may enter the HP section 6 and LP section 4 via one or more inlets 8 in casing 7, and flow axially downstream from the inlet(s) 8. In some embodiments, HP section 6 and LP section 4 are joined by a common shaft 10, which may contact bearings 12, allowing for rotation of the shaft 10, as working fluid (steam) forces rotation of the blades within each of LP section 4 and HP section 6. After performing mechanical work on the blades within LP section 4 and HP section 6, working fluid (e.g., steam) may exit through outlet 14 in casing 7. The center line (CL) 16 of HP section 6 and LP section 4 is shown as a reference point. Both LP section 4 and HP section 6 can include diaphragm assemblies, which are contained within segments of casing 7.

Figure 2:
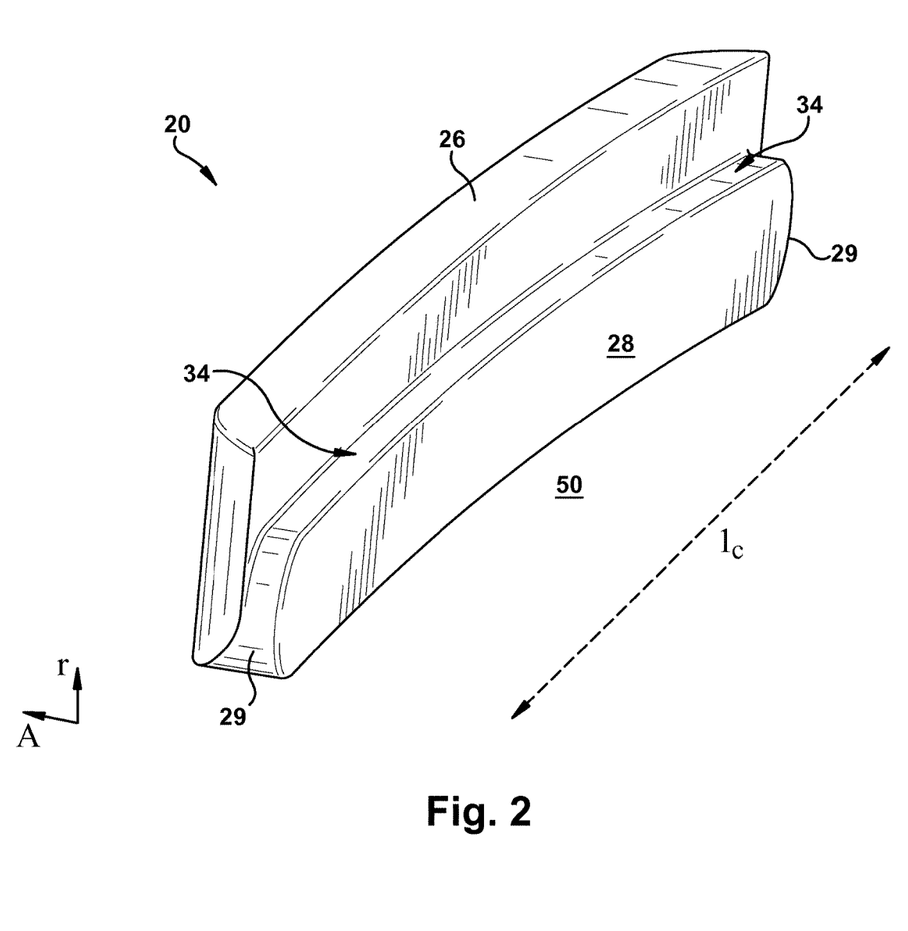
FIG. 2 shows a schematic three-dimensional perspective view of a rotor key member according to various embodiments of the disclosure.
Figure 3:
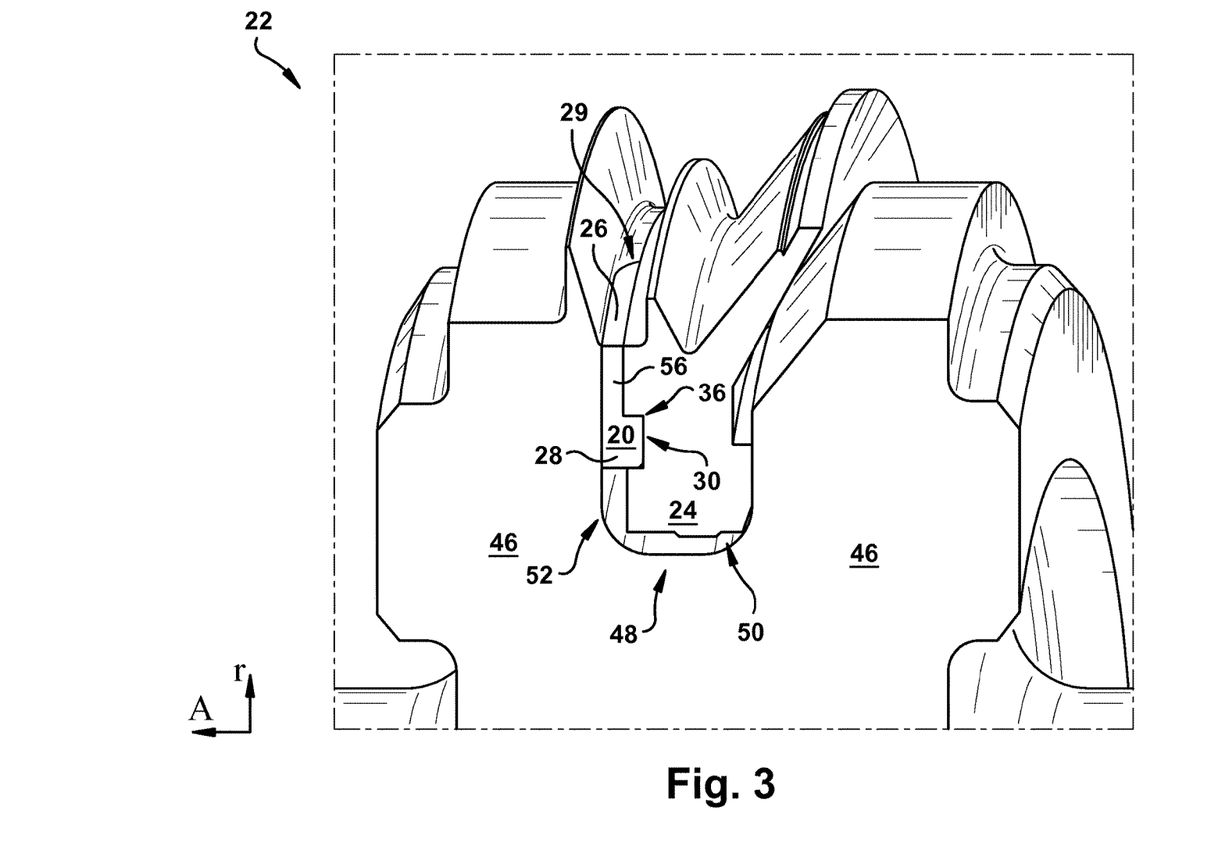
FIG. 3 shows a schematic cut-away perspective view of a steam turbine rotor assembly (or simply, rotor assembly) including a key member, according to various embodiments of the disclosure.
Figure 4:
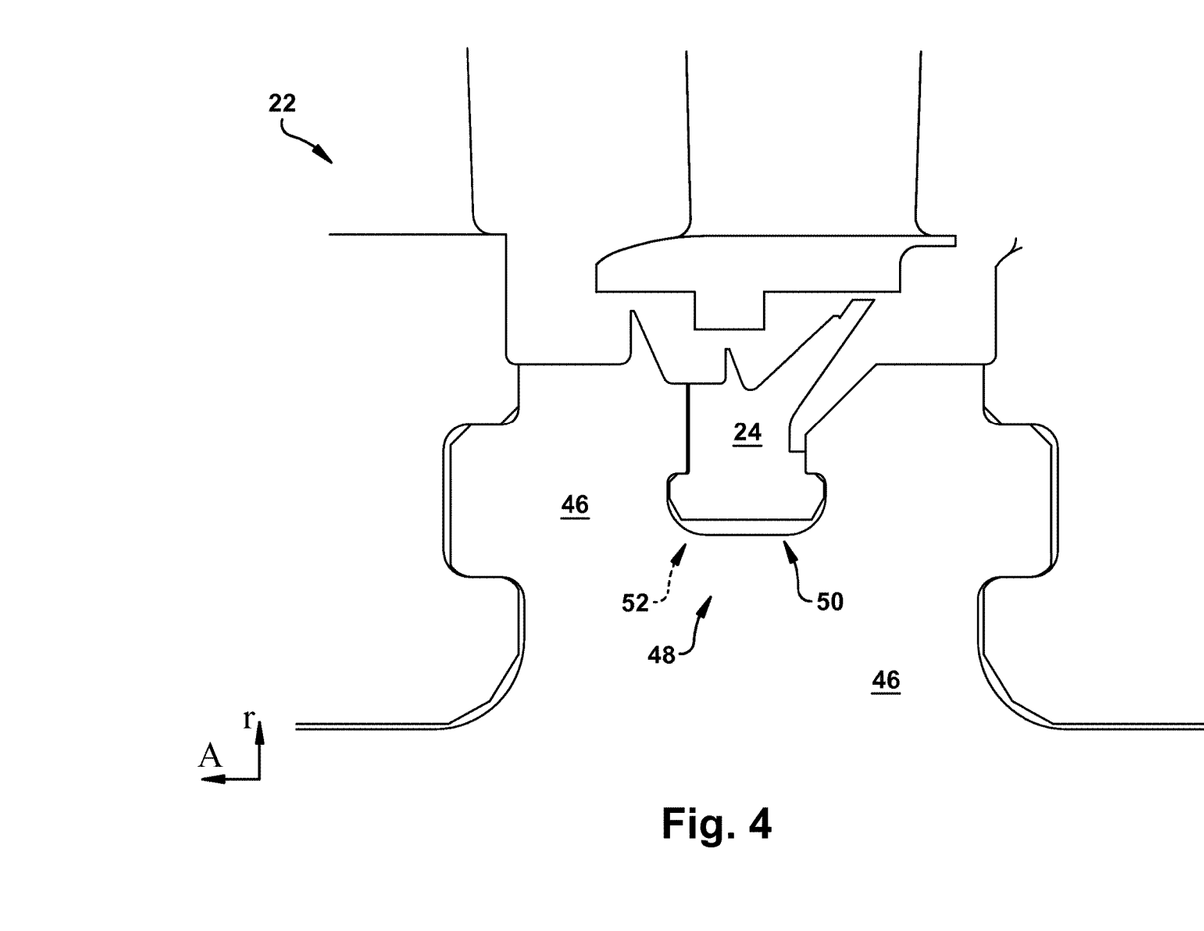
FIG. 4 shows a schematic cut-away view of a rotor assembly, through an intersection which does not display the key member of FIGS. 2 and 3, according to various embodiments of the disclosure.

FIG. 2 shows a schematic three-dimensional perspective view of a rotor key member 20 according to various embodiments of the disclosure. FIG. 3 shows a schematic cut-away perspective view of a steam turbine rotor assembly (or simply, rotor assembly) 22 including key member 20, according to various embodiments. FIG. 4 shows a schematic cut-away view of rotor assembly 22, through an intersection which does not display key member 20. FIGS. 2-4 are referred to simultaneously. As shown in FIG. 2 and FIG. 3, rotor key member 20 is sized (configured) to retain (e.g., circumferentially) a circumferential seal 24 in a steam turbine rotor body 46 (e.g., in a rotor assembly 22 within a steam turbine, such as steam turbine 2). It is understood that the rotor assembly 22 (including circumferential seal 24) can be a component within an HP, IP and/or LP section of a steam turbine (e.g., HP 6, LP 4, etc. section of steam turbine 2).

Rotor key member 20 can include: a main body 26 sized to contact an axial face 56 (axially facing surface) of the circumferential seal 24, and a locking member 28 extending from main body 26 in a direction axially toward circumferential seal 24. Locking member 28 has at least one circumferential edge 29 (facing in circumferential direction, two shown in FIG. 2) sized to substantially (e.g., completely or nearly completely) complement (e.g., fit flush with, or nearly flush with) a corresponding circumferentially extending slot 30 (see also, FIGS. 6, 7 and 8) in circumferential seal 24 to restrict movement of circumferential seal 24 relative to the rotor body 46 (e.g., to restrict circumferential, axial and/or radial movement of circumferential seal 24). Locking member 28 in some cases extends (e.g., in some cases, substantially perpendicularly (e.g., perpendicular within an acceptable margin of deviation, such as 1-3% deviation) from main body 26. In various embodiments, the at least one circumferential edge 29 includes two distinct circumferential edges 29 sized to engage corresponding circumferentially facing walls 32 (FIGS. 6, 7, 8) within slot 30. In some cases, the at least one circumferential edge 29 includes a rounded, bulbous or otherwise curved surface, however, it is understood that the at least one circumferential edge 29 can take any shape or form capable of performing the functions described herein. In various embodiments, main body 26 and locking member 28 form a ledge 34 (FIG. 2) sized to complement (e.g., fit flush with, or nearly flush with) a corresponding shelf 36 in slot 30 (FIG. 3). According to various embodiments, locking member 28 has a circumferential length $l_C$ approximately equal to a circumferential length $l_C$ of the main body 26.

In various embodiments, both main body 26 and locking member 28 (in rotor key members 20) can be substantially unitary and formed of a common material. This material could include a steel, for example, including approximately 2.5 percent to approximately 12 percent chrome (e.g., INCO 615 or INCO 718). In some cases, rotor key member 20 can be made of a single piece of material, e.g., forged, cast, molded or otherwise formed from a common material.

Figure 5:
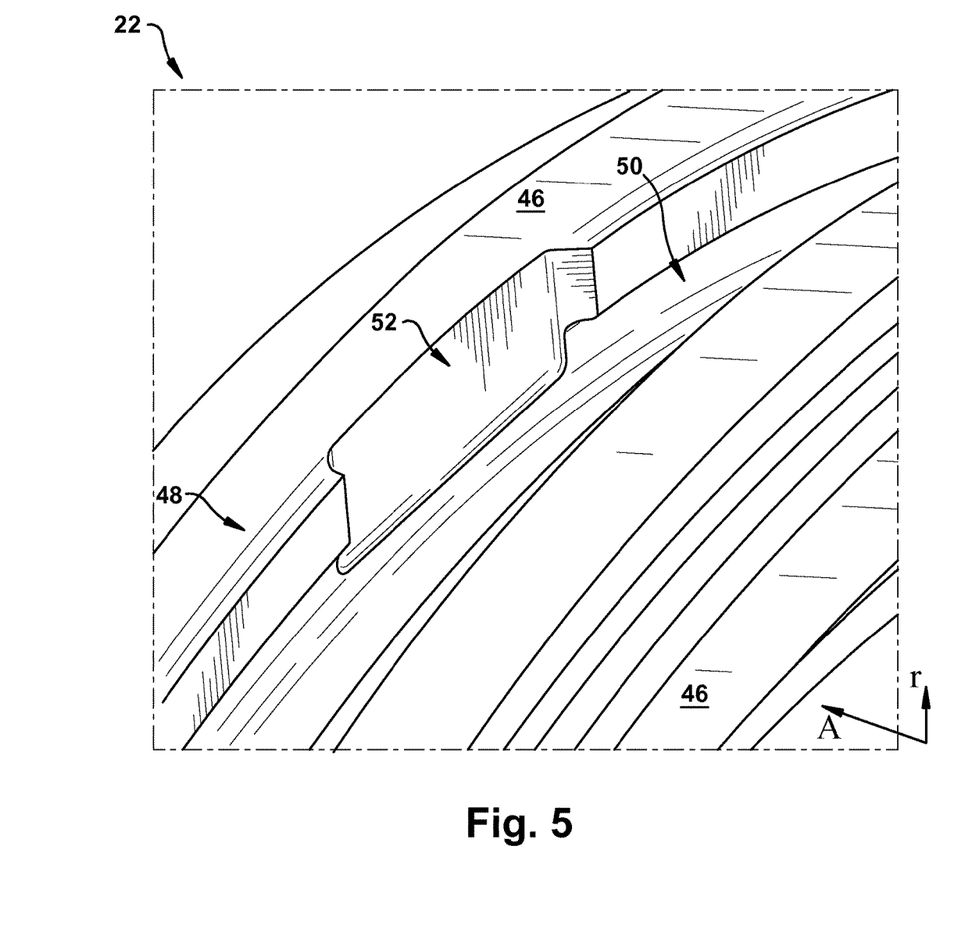
FIG. 5 shows a three-dimensional perspective view of a portion of a rotor assembly according to various embodiments of the disclosure.

FIG. 5 shows a schematic perspective view of a portion of rotor assembly 22, excluding circumferential seal 24 and rotor key 20. According to various embodiments, e.g., as shown in FIGS. 3, 4 and 5, rotor assembly 22 can include rotor body 46 having a slot 48 extending substantially entirely circumferentially about a primary axis (A) of the rotor body 46 (primary axis A corresponding with axis of rotation of steam turbine). Slot 48 can include a primary slot 50 extending substantially an entire circumferential distance about rotor body 46, and a secondary slot 52 (FIGS. 3, 5) extending axially from primary slot 50 and spanning only a portion of the circumferential distance about rotor body 46. As shown in FIG. 3, rotor assembly 22 can further include circumferential seal 24 within primary slot 50, spanning substantially the entire circumferential distance about rotor body 46 (e.g., in sections or as one continuous piece of material).

Figure 6:
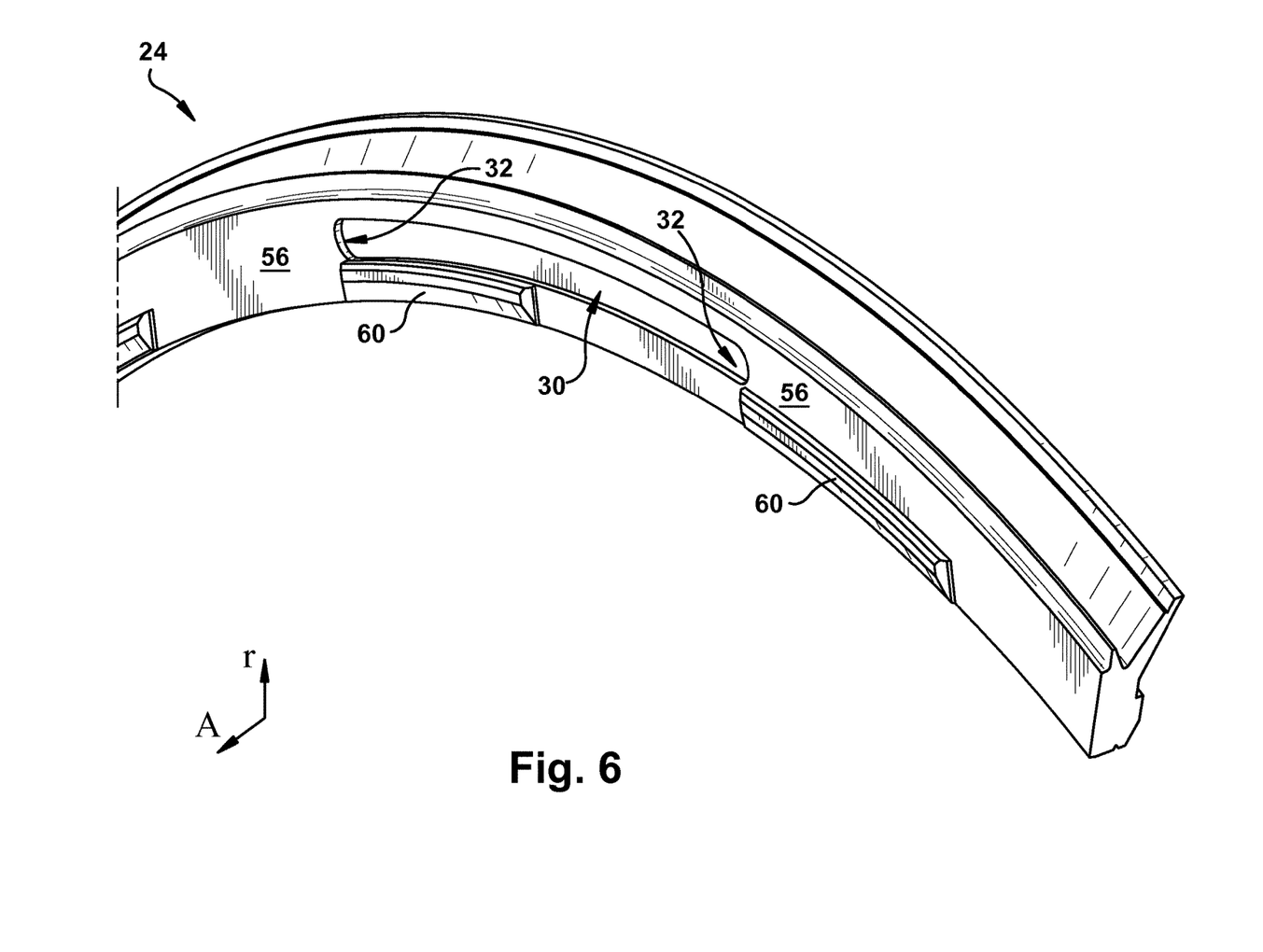
FIG. 6 shows a schematic three-dimensional perspective view of a circumferential seal member according to various embodiments of the disclosure.
Figure 7:
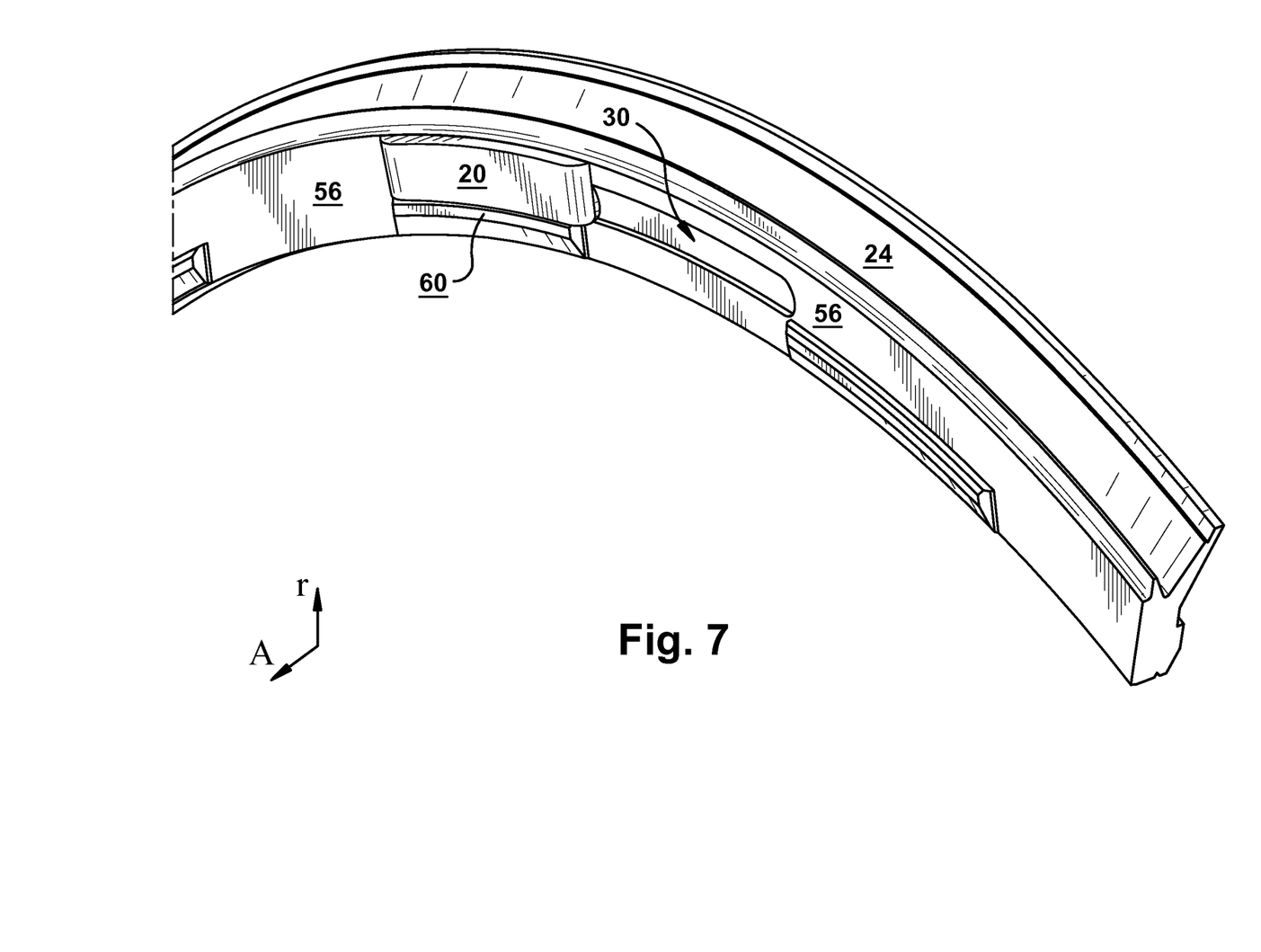
FIG. 7 shows a three-dimensional perspective view of a portion of a rotor assembly in a first position, according to various embodiments of the disclosure.
Figure 8:
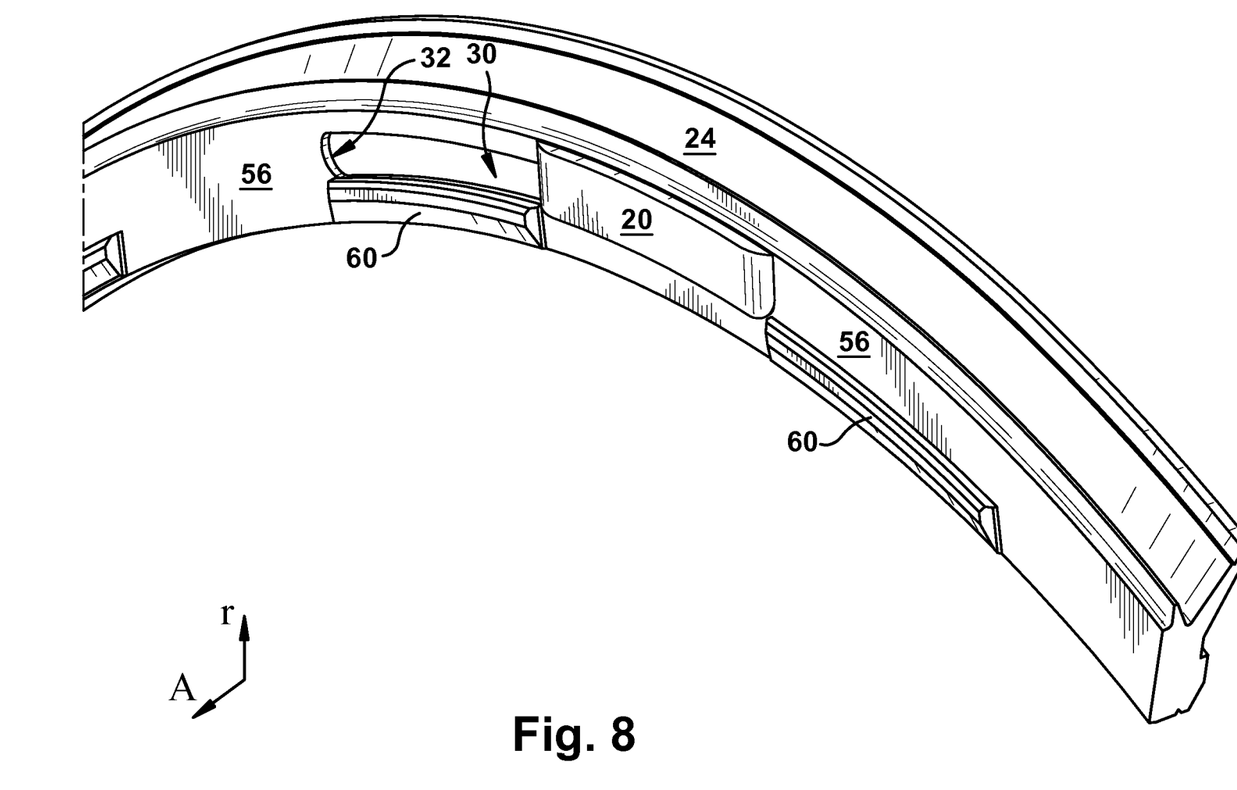
FIG. 8 shows a three-dimensional perspective view of a portion of a rotor assembly in a second position, according to various embodiments of the disclosure.

FIG. 6 shows a schematic perspective view of circumferential seal 24. FIGS. 7 and 8 show schematic perspective views of a portion of rotor assembly 22, including circumferential seal 24 and rotor key member 20 in a first (unlocked) position (FIG. 7), and rotor key member 20 in a second (locked) position (FIG. 8) according to various embodiments. As shown in FIGS. 6, 7 and 8, in some cases, circumferential seal 24 includes a protrusion 60 extending axially from axial face 56 (of circumferential seal 24) toward rotor key member 20. In some cases, protrusion 60 is located radially inward of circumferentially extending slot 30, and can act as a guide for rotor key member 20 when radially inserted into rotor assembly 22 through secondary slot 52 (in first position, shown in FIG. 7). As can be seen in FIG. 8, viewed in conjunction with FIG. 3, rotor key member 20 is sized to pass radially into secondary slot 52, and when rotor key member 20 rotates with rotor body 46 (e.g., clockwise rotation, as in startup or initial loading of turbine, as shown in FIGS. 7-8), locking member 28 slides within circumferentially extending slot 30 to engage one of circumferentially facing walls 32 (within slot 30). By engaging walls 32 (and shelf 36), rotor key member 20 effectively locks circumferential seal 24 circumferentially, because rotor key member 20 is retained within secondary slot 52, while circumferential seal is retained by locking member 28 (via slot 30). Rotor key member 20 rotates with rotor body 46 (retained within secondary slot 52), meaning that it leads the locking mechanism, thereby retaining circumferential seal 24 while moving forward (e.g., in clockwise direction shown in this example).

It is understood that according to various embodiments, rotor key member 20 (and rotor assembly 22) can be utilized in a plurality of stages within a steam turbine (e.g., steam turbine 2), and can aid in both assembly/disassembly of circumferential seal components, as well as reduce wear and complications from component failure. Further, according to various embodiments, circumferential seal 24 can include a plurality (e.g., one or more) slots 30, and a plurality of rotor key members 20 can be utilized to correspond with the number of slots and retain circumferential seal 24 as described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor key member for circumferentially retaining a circumferential seal in a steam turbine rotor body, the steam turbine rotor body having a slot extending substantially entirely circumferentially about a primary axis of the rotor body, the slot in the rotor body including: a primary slot extending substantially an entire circumferential distance about the rotor body; and a secondary slot extending axially from the primary slot and spanning only a portion of the circumferential distance relative to the rotor body, the rotor key member comprising:
   a main body sized to contact an axial face of the circumferential seal; and
   a locking member extending from the main body in a direction axially toward the circumferential seal, the locking member having at least one circumferential edge sized to substantially complement a corresponding slot in the circumferential seal to restrict movement of the circumferential seal relative to the steam turbine rotor body,
   wherein the at least one circumferential edge includes two distinct circumferential edges sized to engage corresponding circumferentially facing walls within the slot in the circumferential seal, wherein the main body and the locking member form a ledge sized to complement a corresponding shelf in the slot in the circumferential seal, wherein the rotor key member is sized to pass radially into the secondary slot in the rotor body, and when the rotor key member rotates with the rotor body, the locking member is configured to slide within the corresponding slot in the circumferential seal to engage one of the circumferentially facing walls within the corresponding slot in the circumferential seal.

2. The rotor key member of claim 1, wherein the main body and the locking member are unitary and formed of a common material.

3. The rotor key member of claim 2, wherein the common material includes steel.

4. The rotor key member of claim 1, wherein the locking member has a circumferential length approximately equal to a circumferential length of the main body.

5. A steam turbine rotor assembly comprising:
   a rotor body having a slot extending substantially entirely circumferentially about a primary axis of the rotor body, the slot in the rotor body including:
      a primary slot extending substantially an entire circumferential distance about the rotor body; and
      a secondary slot extending axially from the primary slot and spanning only a portion of the circumferential distance about the rotor body;
   a circumferential seal within the primary slot spanning substantially the entire circumferential distance about the rotor body, the circumferential seal including at least one circumferentially extending slot; and
   a rotor key member having:
      a main body sized to contact an axial face of the circumferential seal; and
      a locking member extending from the main body in a direction axially toward the circumferential seal, the locking member having at least one circumferential edge sized to substantially complement the at least one circumferentially extending slot in the circumferential seal to restrict movement of the circumferential seal relative to the rotor body, wherein the at least one circumferential edge includes two distinct circumferential edges sized to engage corresponding circumferentially facing walls within the at least one circumferentially extending slot in the circumferential seal, and wherein the rotor key member is sized to pass radially into the secondary slot in the rotor body, and when the rotor key member rotates with the rotor body, the locking member slides within the circumferentially extending slot in the circumferential seal to engage one of the circumferentially facing walls within the at least one circumferentially extending slot in the circumferential seal.

6. The steam turbine rotor assembly of claim 5, wherein the circumferentially extending slot in the circumferential seal only extends a portion of the circumferential distance relative to the rotor body.

7. The steam turbine rotor assembly of claim 5, wherein the circumferential seal further includes a protrusion extending axially from the axial face toward the rotor key member.

8. The steam turbine rotor assembly of claim 7, wherein the protrusion is located radially inward of the circumferentially extending slot in the circumferential seal.

9. The steam turbine rotor assembly of claim 5, wherein the main body and the locking member form a ledge sized to complement a corresponding shelf in the slot in the circumferential seal.

10. The steam turbine rotor assembly of claim 5, wherein the main body and the locking member are unitary and formed of a common material.

11. The steam turbine rotor assembly of claim 5, wherein the locking member has a circumferential length approximately equal to a circumferential length of the main body.

12. A steam turbine comprising:
a casing; and
a rotor assembly at least partially contained within the casing, the rotor assembly having:
　a rotor body having a slot extending substantially entirely circumferentially about a primary axis of the rotor body, the slot in the rotor body including:
　　a primary slot extending substantially an entire circumferential distance about the rotor body; and
　　a secondary slot extending axially from the primary slot and spanning only a portion of the circumferential distance about the rotor body;
　a circumferential seal within the primary slot spanning substantially the entire circumferential distance about the rotor body, the circumferential seal including at least one circumferentially extending slot; and
　a rotor key member having:
　　a main body sized to contact an axial face of the circumferential seal; and
　　a locking member extending from the main body in a direction axially toward the circumferential seal, the locking member having at least one circumferential edge sized to substantially complement the at least one circumferentially extending slot in the circumferential seal to restrict movement of the circumferential seal relative to the rotor body,
　　wherein the at least one circumferential edge includes two distinct circumferential edges sized to engage corresponding circumferentially facing walls within the at least one circumferentially extending slot in the circumferential seal, wherein the rotor key member is sized to pass radially into the secondary slot in the rotor body, and when the rotor key member rotates with the rotor body, the locking member slides within the at least one circumferentially extending slot in the circumferential seal to engage one of the circumferentially facing walls within the at least one circumferentially extending slot in the circumferential seal.

13. The steam turbine of claim 12, wherein the at least one circumferentially extending slot in the circumferential seal only extends a portion of the circumferential distance about the rotor body.

14. The steam turbine of claim 12, wherein the circumferential seal further includes a protrusion extending axially from the axial face toward the rotor key member, wherein the protrusion is located radially inward of the at least one circumferentially extending slot in the circumferential seal.

15. The steam turbine of claim 12, wherein the main body and the locking member form a ledge sized to complement a corresponding shelf in each of the at least one slots in the circumferential seal.

* * * * *